United States Patent
Behzadi

(10) Patent No.: US 9,747,713 B2
(45) Date of Patent: Aug. 29, 2017

(54) PERFORMING EDITING ACTIONS ON RECENT DRAWING MARKS

(71) Applicant: Adobe Systems Incorporated, San Jose, CA (US)

(72) Inventor: Arian Behzadi, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 256 days.

(21) Appl. No.: 14/249,121

(22) Filed: Apr. 9, 2014

(65) Prior Publication Data

US 2015/0294489 A1    Oct. 15, 2015

(51) Int. Cl.
| | | |
|---|---|---|
| G06F 17/22 | (2006.01) | |
| G06T 11/60 | (2006.01) | |
| G06F 3/0481 | (2013.01) | |
| G06F 3/0488 | (2013.01) | |
| G06F 3/0484 | (2013.01) | |

(52) U.S. Cl.
CPC ............ *G06T 11/60* (2013.01); *G06F 3/0481* (2013.01); *G06F 3/0488* (2013.01); *G06F 3/04845* (2013.01)

(58) Field of Classification Search
CPC .... G06T 11/60; G06F 3/04845; G06F 3/0488; G06F 3/0481
See application file for complete search history.

(56) References Cited

U.S. PATENT DOCUMENTS

| | | | | |
|---|---|---|---|---|
| 5,757,380 A * | 5/1998 | Bardon | ............... | G06F 3/04845 345/629 |
| 6,377,240 B1 * | 4/2002 | Baudel | .................... | G06T 11/20 345/157 |
| 7,646,386 B2 * | 1/2010 | Schuster | ................. | G06T 11/60 345/441 |
| 7,689,928 B1 * | 3/2010 | Gilra | ................... | G06F 3/04855 715/786 |
| 8,847,983 B1 * | 9/2014 | Ranganathan | .......... | G06T 11/60 345/594 |
| 8,856,669 B2 * | 10/2014 | Goodman | ............... | G06F 3/033 715/764 |
| 8,896,621 B1 * | 11/2014 | Sipher | ................. | G06F 3/04883 345/418 |
| 9,035,953 B1 * | 5/2015 | Kukulski | .............. | G06T 11/203 345/443 |
| 9,619,108 B2 * | 4/2017 | Dowd | .................... | G06F 3/0482 |
| 2005/0179694 A1 * | 8/2005 | Liu | ................... | G06F 17/30259 345/581 |
| 2005/0244058 A1 * | 11/2005 | Gorbatov | ............... | G06K 9/222 382/202 |

(Continued)

*Primary Examiner* — Maikhanh Nguyen
(74) *Attorney, Agent, or Firm* — Wolfe-SBMC

(57) ABSTRACT

This document describes techniques for performing editing actions on recent drawing marks using a recent mark tool. The recent mark tool is configured to separately access recent drawing marks drawn on a drawing interface, and to perform an editing action (e.g., erase or move) on the recent drawing marks without affecting previous drawing marks drawn on the drawing interface. In one or more implementations the recent mark tool is implemented as a recent mark eraser that is configured to erase a recent drawing mark made to the drawing interface without erasing previous drawing marks made to the drawing interface.

20 Claims, 12 Drawing Sheets

(56) References Cited

U.S. PATENT DOCUMENTS

| | | | |
|---|---|---|---|
| 2006/0232603 A1* | 10/2006 | Schuster | G06T 11/60 345/619 |
| 2011/0126129 A1* | 5/2011 | Nagahara | G06T 11/60 715/753 |
| 2013/0127867 A1* | 5/2013 | Tijssen | G06T 11/203 345/441 |
| 2013/0127910 A1* | 5/2013 | Tijssen | G06F 3/04883 345/642 |
| 2014/0053051 A1* | 2/2014 | Chen | G06F 17/30861 715/211 |

* cited by examiner

PERFORMING EDITING ACTIONS ON RECENT DRAWING MARKS

BACKGROUND

Many drawing applications do not utilize a layer model, and thus all drawing marks received by the drawing application are committed to a single layer. This makes it difficult to perform editing actions on specific marks of the drawn image.

For example, consider that a first drawing mark followed by a second drawing mark is drawn to a drawing surface. In conventional single layer drawing applications, a user will be unable to separately access the second drawing mark to perform an editing action on the second drawing mark without affecting the first drawing mark. For example, if the user attempts to erase the second drawing mark at an area of the drawing surface that includes both the first drawing mark and the second drawing mark, both the first drawing mark and the second drawing mark will be erased by the eraser.

Conventional drawing applications that utilize multiple layers also make it difficult to perform editing actions on specific marks of the drawn image. In the example above, a conventional drawing application that utilizes multiple layers may enable the user to take the extra step of manually creating a new layer for the second drawing mark prior to drawing the second drawing mark. However, it is inconvenient to require users to manually create a new layer prior to drawing a new drawing mark to ensure that the new drawing mark may be separately accessed.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

This document describes techniques for performing editing actions on recent drawing marks using a recent mark tool. The recent mark tool is configured to separately access recent drawing marks drawn on a drawing interface, and to perform an editing action (e.g., erase or move) on the recent drawing marks without affecting previous drawing marks drawn on the drawing interface. In one or more implementations the recent mark tool is implemented as a recent mark eraser that is configured to erase a recent drawing mark made to the drawing interface without erasing previous drawing marks made to the drawing interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

Figure 1:
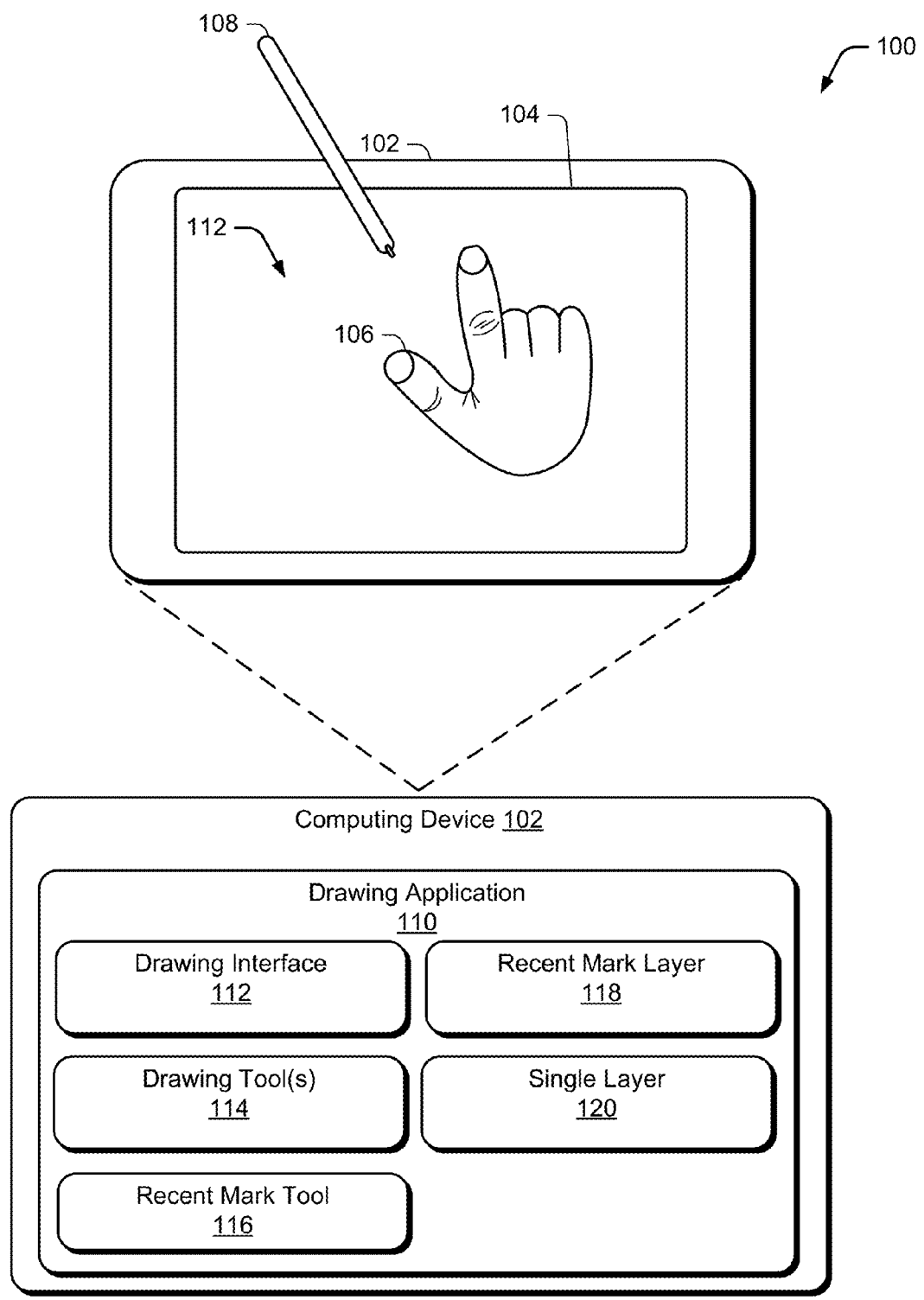
FIG. 1 illustrates an environment in an example implementation that is operable to employ techniques described herein.

This document describes techniques for performing editing actions on recent drawing marks using a recent mark tool. The recent mark tool is configured to separately access recent drawing marks drawn on a drawing interface. In some implementations, the recent mark tool is configured to access the recent drawing marks from a recent mark layer, which automatically and temporarily stores the recent drawing marks until a next drawing mark is drawn to the drawing interface. When a next drawing mark is drawn to the drawing interface, the drawing marks stored in the recent mark layer are committed to a single layer along with previous drawing marks, and are replaced by the next drawing marks in the recent mark layer. Thus, prior to receiving the next drawing mark, the recent mark tool can perform an editing action (e.g., erase or move) on the recent drawing marks stored in the recent mark layer without affecting previous drawing marks drawn on the drawing interface.

It is to be appreciated, therefore, that the recent mark tool may be utilized by single layer drawing applications to enable editing actions to be performed on recent drawing marks. Additionally, the recent mark tool may be utilized by multiple layer drawing applications to enable users to separately access recent drawing marks without the need to manually create a separate layer for new drawing marks prior to drawing each new drawing mark.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 illustrates an environment 100 in an example implementation that is operable to employ techniques described herein. Environment 100 includes a computing device 102. In FIG. 1, computing device 102 is illustrated as a tablet computing device. It is to be appreciated, however, that computing device 102 may be configured in a variety of different ways. For instance, computing device 102 may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to low-resource devices with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 7.

Computing device 102 further includes a display device 104 that is configured to render images for viewing. In one or more implementations, display device 104 may be implemented as a touch screen display that is configured to receive touch input via one or more fingers of a user's hand 106 or a stylus 108. Display device 104 may receive input via other input devices which are not pictured in FIG. 1, such as a mouse input device, a keyboard input device, a touch pad, and the like.

Computing device 102 is includes a drawing application 110 that enables a user to draw in a drawing interface 112 rendered by display device 104. Drawing application 110 may be implemented as any type of drawing application, such as Adobe® Photoshop, Adobe® Illustrator, Adobe® Ideas, or Paper by FiftyThree, to name just a few.

Drawing interface 112 enables a user to draw using one or more drawing tools 114, which may include, by way of example and not limitation, a pen, pencil, marker, eraser, line tool, shape tool, fill color, and so on. Drawing tools 114 can be selected by the user, and used to input drawing marks on drawing interface 112, such as using a finger of the user's hand 106 or stylus 108. As described herein, "drawing marks" can include any type of drawing mark or stroke input to a drawing application, such as free-form drawing marks, lines, shapes, and the like.

In some cases, drawing application 110 is a single layer drawing application. Conventionally, a single layer drawing application commits each drawing mark to a single layer. For example, if two drawing marks are received, both drawing marks are committed to the single layer. Users are unable to separately access drawing marks after they are committed to a single layer.

In one or more implementations, in order to enable separate access to recent drawing marks, drawing application 110 includes a recent mark tool 116 that is configured to automatically and temporarily store recent drawing marks in a recent mark layer 118 before the marks are committed to a single layer 120. Recent mark layer 118 automatically isolates the recent drawing marks in the recent mark layer 118 without the user having to perform any additional action. When a next mark is received, drawing application 110 automatically commits the drawing marks stored in recent mark layer 118 to the single layer 120 of drawing application 110 along with previous drawing marks.

Recent mark tool 116 is configured to separately access recent drawing marks from the recent mark layer 118, and to perform editing actions on the recent drawing marks without affecting previous drawing marks which have been committed to the single layer 120 of drawing application 110. For example, because the recent marks are not immediately committed to the single layer 120 when the drawing marks are received, recent mark tool can act on the recent marks without affecting marks previously committed to the single layer 120. As described herein, "editing actions" can include any type of editing action made to drawing marks rendered by drawing interface 112, such as erasing, moving, or resizing the drawing marks.

In one or more implementations, recent mark tool 116 is implemented as a recent mark eraser that is configured to erase recent drawing marks without erasing previous drawing marks. The recent mark eraser is discussed in further detail below with regards to FIGS. 3*a*, 3*b*, 3*c*, and 3*d*.

Figure 7:
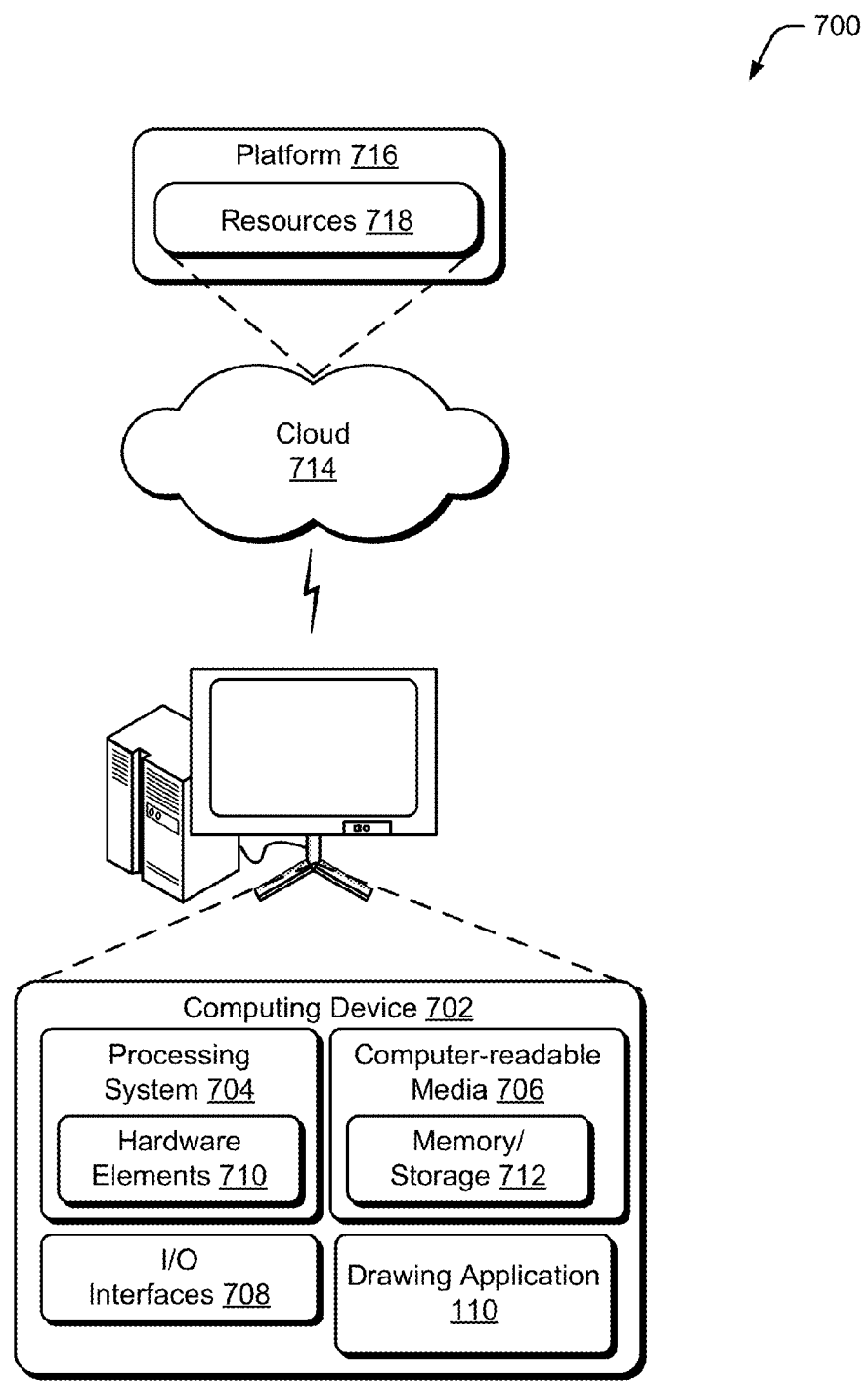
FIG. 7 illustrates an example system including various components of an example device that can be implemented as any type of computing device as described and/or utilized with reference to FIGS. 1-6 to implement embodiments of the techniques described herein.

Although illustrated as part of computing device 102, functionality of drawing application 110 and recent mark tool 116 may also be implemented in a distributed environment, remotely via a network (e.g., "over the cloud") as further described in relation to FIG. 7, and so on.

Figure 2A:
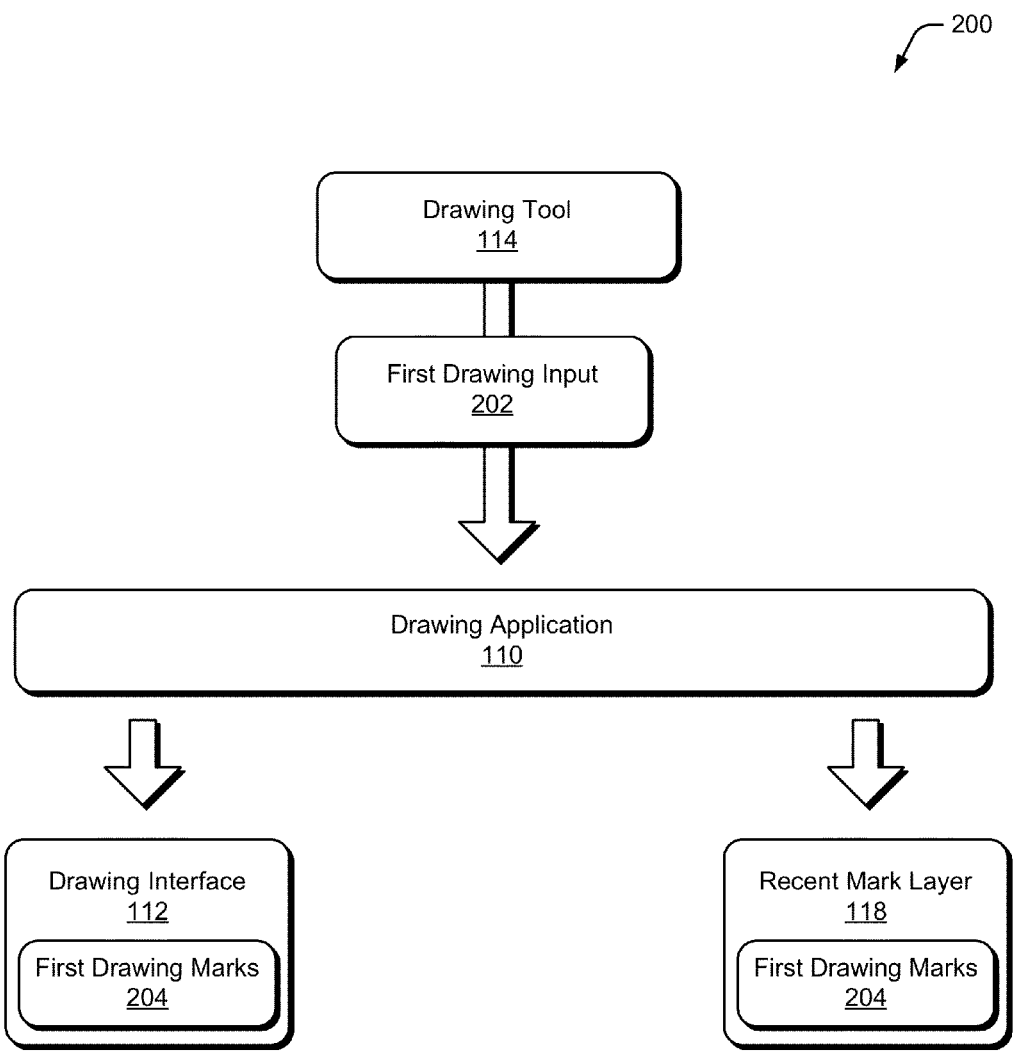
FIGS. 2*a*, 2*b*, and 2*c* illustrate a system in an example implementation in which the recent mark tool is used to perform an editing action on recent drawing marks without affecting previous drawing marks
Figure 2B:
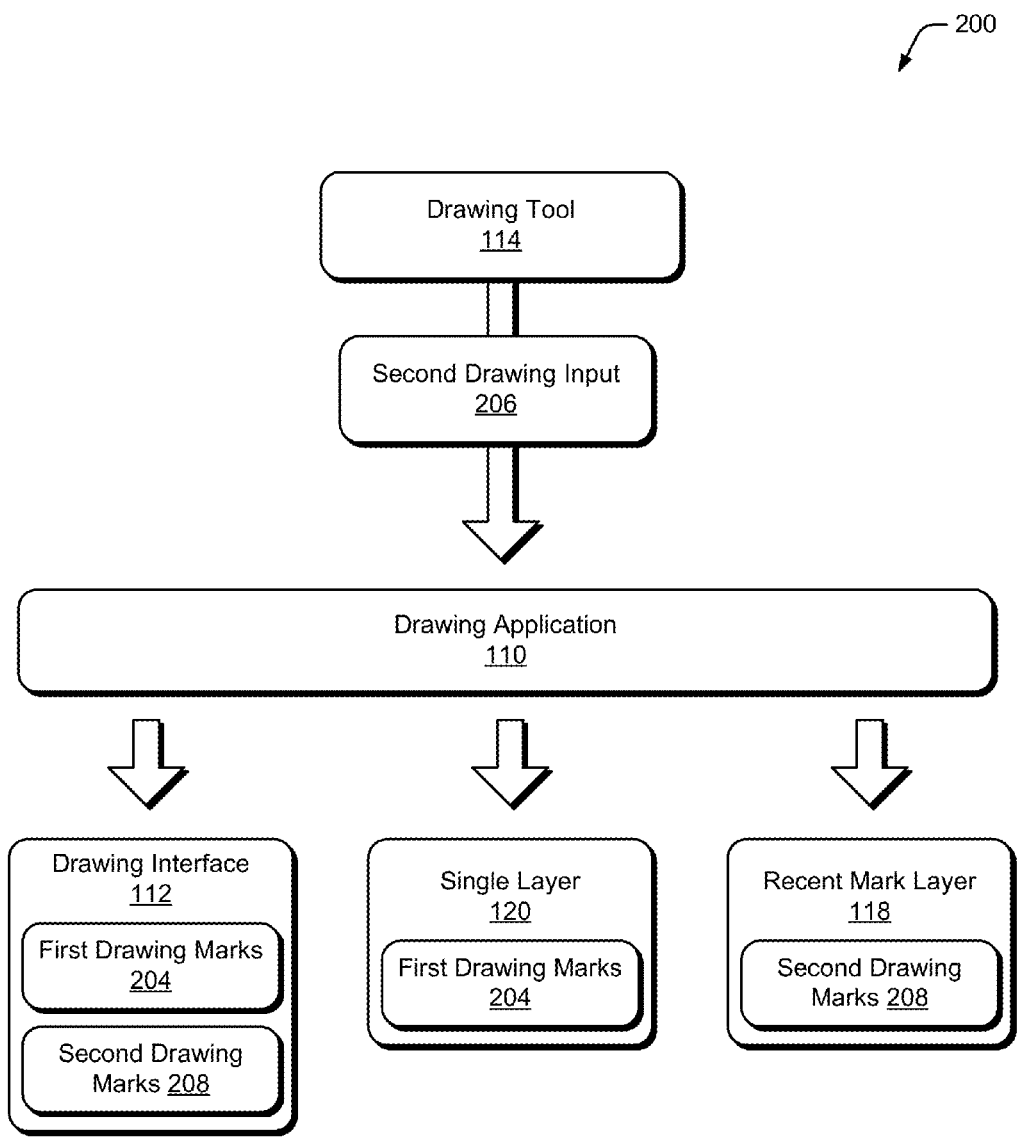
Figure 2C:
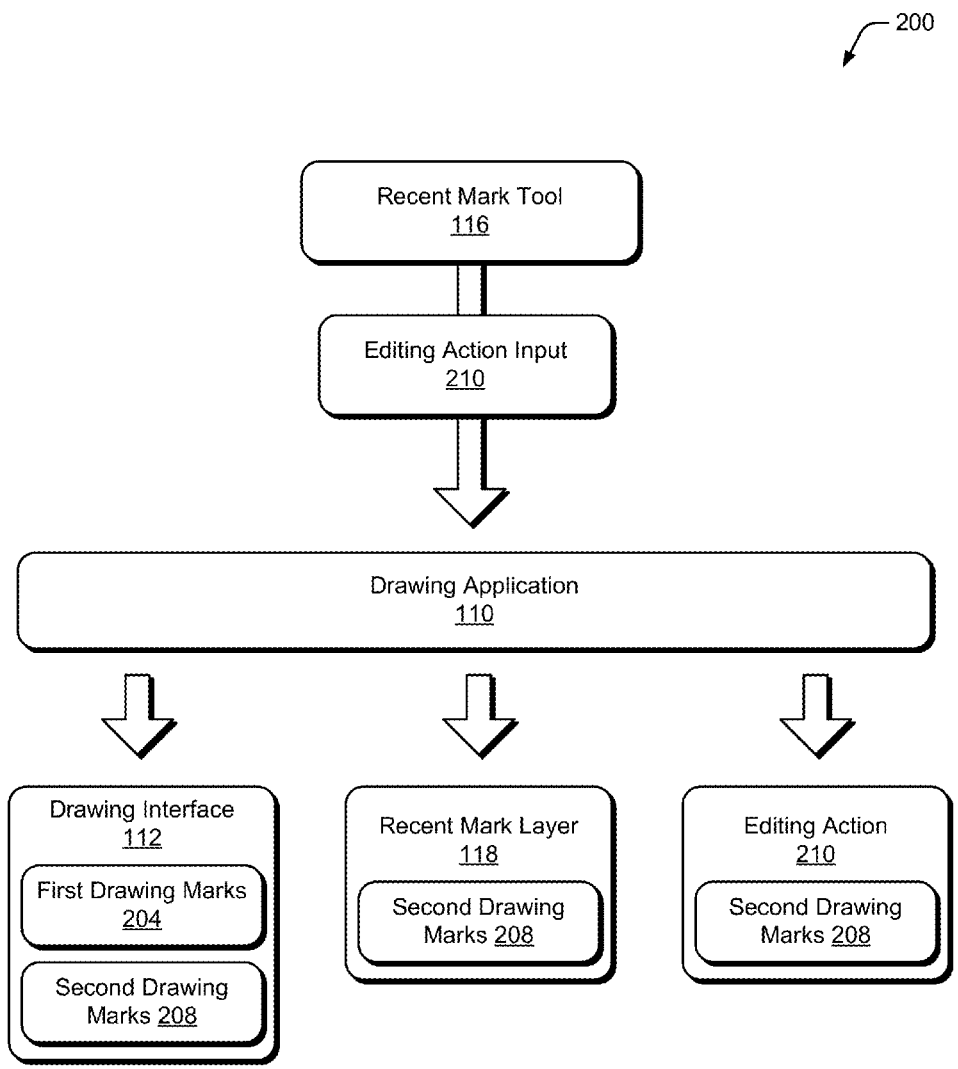

FIGS. 2*a*, 2*b*, and 2*c* illustrate a system 200 in an example implementation in which the recent mark tool is used to perform an editing action on recent drawing marks without affecting previous drawing marks.

In FIG. 2*a*, drawing interface 112 of drawing application 110 receives first drawing input 202 from a selected drawing tool 114. For example, the drawing input can be received as drawing marks or strokes that are drawn to drawing interface 112 using any type of drawing tool 114, such as a pen, pencil, marker, line tool, and the like. In response to receiving first drawing input 202, drawing application 110 renders first drawing marks 204 corresponding to the first drawing input 202 on drawing interface 112.

Conventional single layer drawing applications commit drawing marks to a single layer to be compressed with previously-committed drawing marks when drawing input is received. This makes it difficult to separately access drawing marks without affecting the previously-committed drawing marks.

Thus, in one or more implementations, rather than commit the drawing marks to single layer 120, recent mark tool 116 automatically and temporarily stores the first drawing marks 204 in recent mark layer 118 when first drawing input 202 is received. Storing first drawing marks 204 in recent mark layer 118 enables the first drawing marks 204 to be separately accessed by recent mark tool 116 as long as a next drawing mark has not yet been drawn to drawing interface 112.

In FIG. 2*b*, drawing interface 112 receives second drawing input 206 from a selected drawing tool 114. The selected drawing tool 114 may be the same or a different drawing tool 114 than the drawing tool used for the first drawing input 202. When second drawing input 206 is received, drawing application 110 renders second drawing marks 208 corresponding to second drawing input 206 on drawing interface 112 along with first drawing marks 204.

In addition, when the second drawing input 206 is received, drawing application 110 commits first drawing marks 204 to single layer 120, and recent mark tool 116 replaces the first drawing marks 204 with the second drawing marks 208 in the recent mark layer 118. By doing this, recent mark tool 116 may no longer be able to separately access the first drawing marks 204. However, recent mark tool 116 may now separately access second drawing marks 208 from recent mark layer 118. It is to be appreciated, therefore, that the recent mark tool 116 continues to replace previous drawing marks temporarily stored in recent mark layer 118 with the "most-recent" drawing marks.

As described herein, the "most-recent" drawing marks correspond to the most-recent or last marks or strokes made to drawing interface 112. In some cases, the most-recent marks may include all of the drawing marks received as long as the drawing input device (e.g., the finger of the user's hand 106 or the stylus 108) remains in contact with drawing interface 112. Alternately or additionally, the most-recent drawing marks may include all drawing marks made to drawing interface 112 with a particular drawing setting. For example, if the user has selected a pen drawing tool and a color of black, all drawing marks made using the black pen will be considered the most-recent drawing marks.

In FIG. 2c, drawing application 110 receives editing action input 210 from recent mark tool 116. The editing action input 210 may correspond to an editing action to edit drawing marks rendered on drawing interface 112, such as to erase, move, or resize drawing marks rendered on drawing interface 112. Application 110 enables recent mark tool to perform an editing action 212 on second drawing marks 208 which are stored in recent mark layer 118, without affecting first drawing marks 204 which are committed to the single layer 120.

In order to better understand the concept of a recent mark action 214, consider the following example of using a recent mark eraser to erase recent drawing marks.

Implementation Example

FIGS. 3a, 3b, 3c, and 3d illustrate an example 300 of using a recent mark eraser to erase recent drawing marks without erasing previous drawing marks.

Figure 3A:
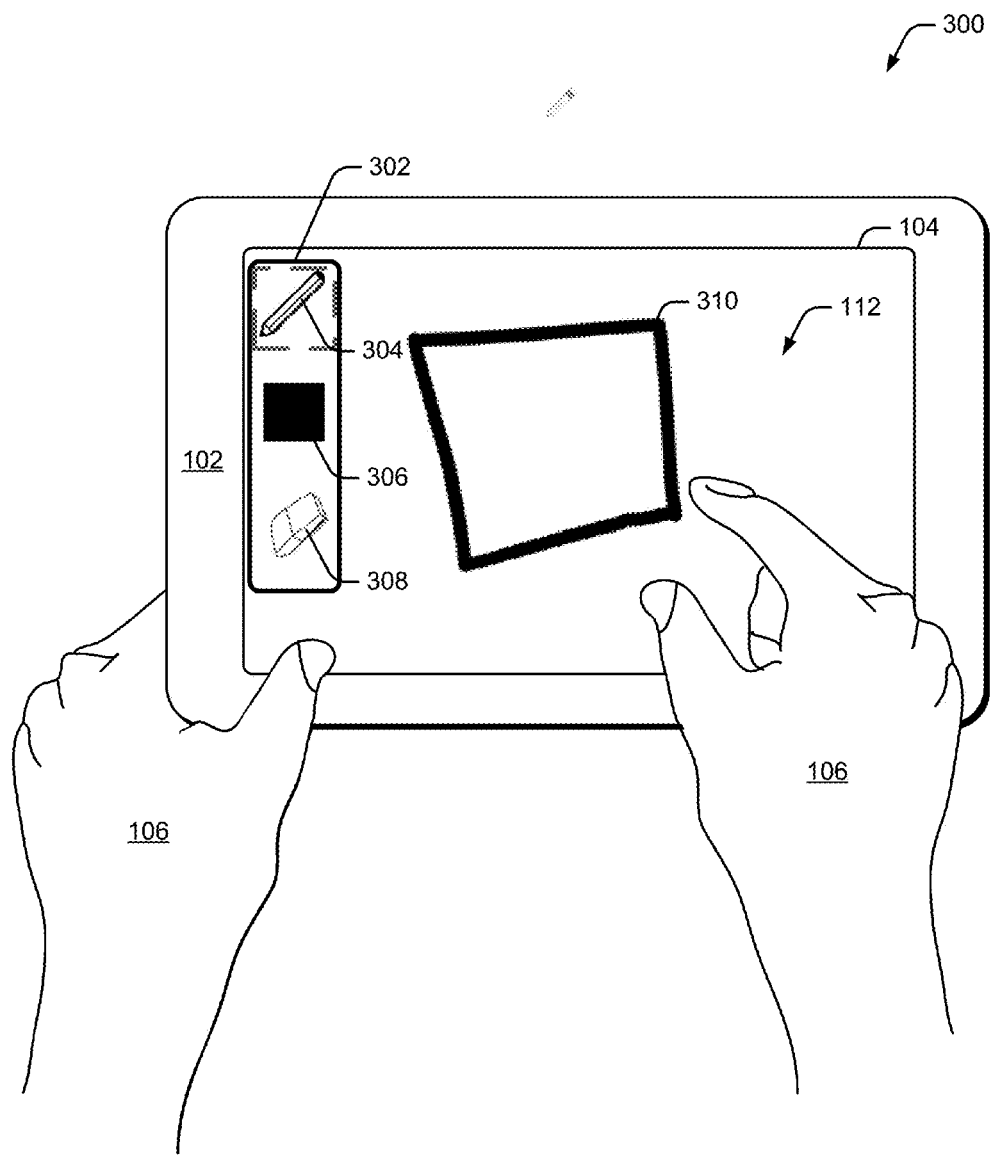
FIGS. 3*a*, 3*b*, 3*c*, and 3*d* illustrate an example of using a recent mark eraser to erase recent drawing marks without erasing previous drawing marks.

In FIG. 3a, drawing application 110 renders drawing user interface 112 on display device 104 of computing device 102. The user interacts with drawing interface 112 using a finger of the user's hand 106. It is to be appreciated, however, that drawing application 110 may enable the user to interact with drawing interface 112 using any type of input device, such as stylus 108 or a mouse input device.

Drawing interface 112 is configured to receive drawing input from the user (e.g., via a finger of the user's hand 106), and to render drawing marks based on the drawing input. Drawing interface 112 includes a drawing tools interface 302, which in this example enables a user to select a pen 304, a color control 306, and a recent mark eraser 308. It is to be appreciated, however, that drawing tools interface 302 may also include a variety of other drawing tools, such as a shape tools, line tools, and the like. When pen 304 is selected, the user can draw using pen 304 in drawing interface 112. Color control 306 enables the user to select a color of the marks rendered by pen 304. Recent mark eraser 308 enables the user to erase recent drawing marks rendered on drawing interface 112 without erasing previous drawing marks.

In this example, the user has selected pen 304 and set the color of pen 304 to black using color control 306. The user then draws black drawing marks 310, corresponding to a black square, on drawing interface 112. To do so, the user contacts drawing interface 112 with the index finger of the user's hand 106, and moves the index finger across drawing interface 112 to draw black drawing marks 310.

Figure 3B:
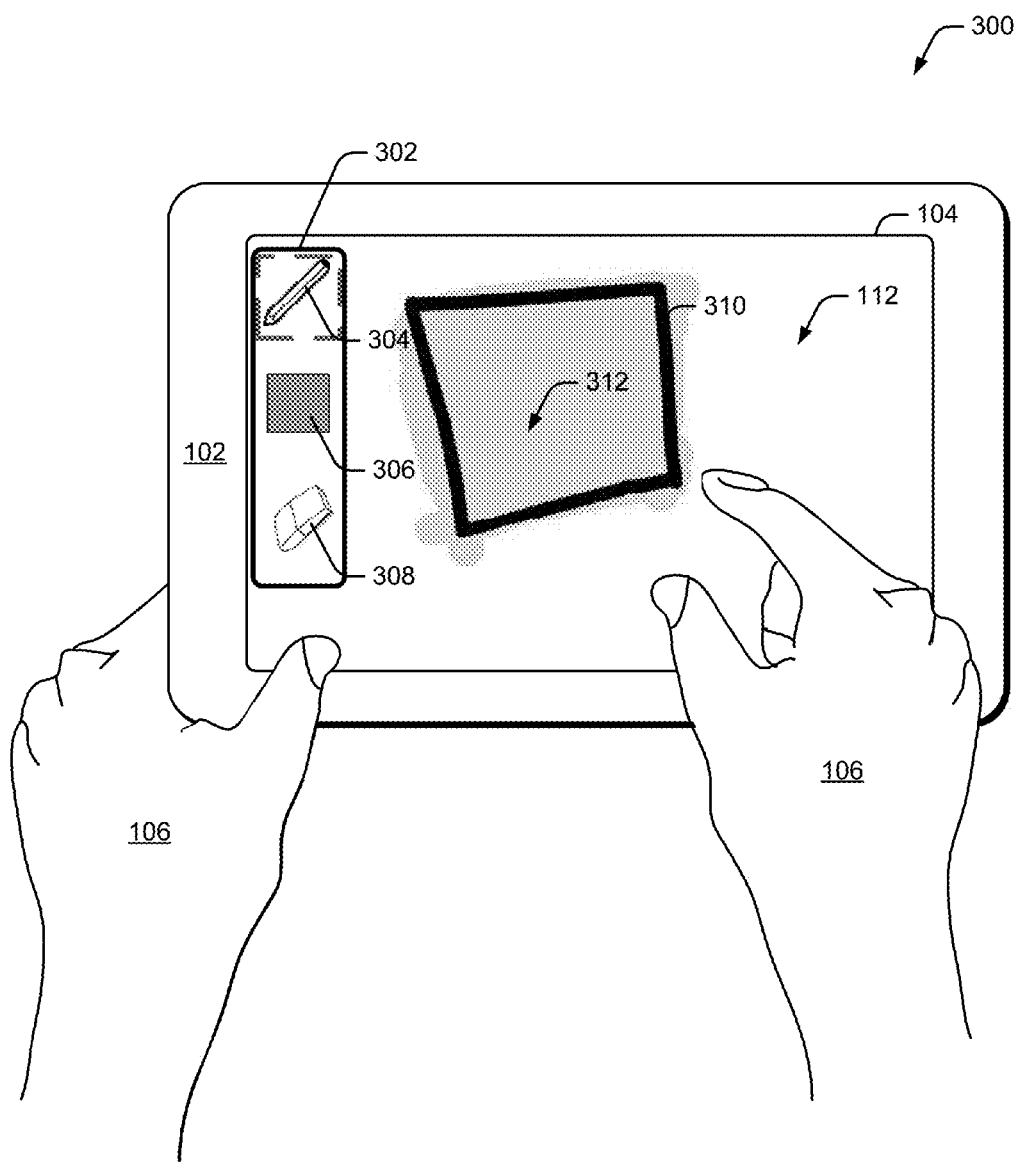

In this example, consider that the user would like to cleanly fill in the black square of black drawing marks 310 with gray drawing marks 312. Thus, in FIG. 3b, the user changes the color of the pen from black to gray using color control 306. The user then draws gray drawing marks 312 to color in the black square of black drawing marks 310 with gray. To do so, the user contacts drawing interface 112 with the index finger of the user's hand 106, and moves the index finger across drawing interface 112 to draw gray drawing marks 312. In FIG. 3b the user has filled in the entirety of the black square of black drawing marks 310 with the gray drawing marks 312, but doing so results in some coloring outside of the black square. Thus, the user may wish to erase the gray drawing marks 312 that have spilled over the edge of the black drawing marks 310.

In this example, conventional solutions may commit the black drawing marks 310 and the gray drawing marks 312 to a single layer, making it impossible to separately access either the black marks or the gray marks. Thus, if the desired result is a clean black square, the user must be extremely careful in erasing the gray drawing marks 312 without also erasing the black drawing marks 310 when using conventional solutions. For example, in FIG. 3b, conventional solutions would prevent a user from erasing just the gray drawing marks 312 without also erasing the black drawing marks 310. Thus, if the user were to try to erase the gray drawing marks 312 from an area of drawing interface 112 that also includes black drawing marks 310, conventional solutions would erase both the gray drawing marks and the black drawing marks.

Now, recent mark eraser 308 is able to separately access gray drawing marks 312 from recent marks layer 118 and erase the gray drawing marks 312 without erasing the black drawing marks 310. For example, when black drawing marks 310 are received, the black drawing marks 310 are automatically and temporarily stored in recent mark layer 118. Subsequently, when the gray drawing marks 312 are received, the black drawing marks 310 are committed to the single layer 120, and the gray drawing marks 312 are stored in recent marks layer 118 replacing the black drawing marks 310. Thus, the user can quickly and easily erase the gray drawing marks 312 without erasing the black drawing marks 310.

Figure 3C:
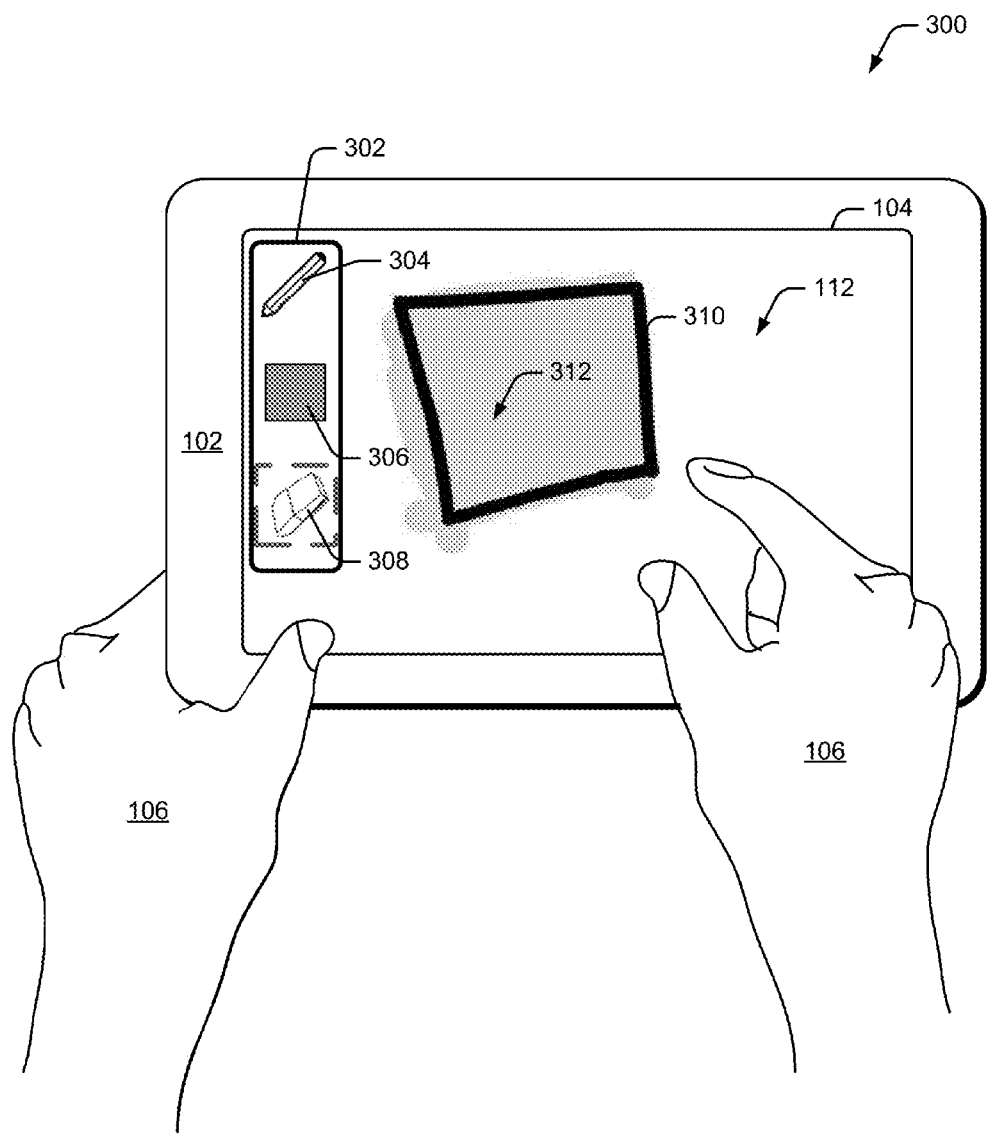

In FIG. 3c the user selects recent mark eraser 308, and begins erasing gray drawing marks 312 that have spilled over the edges of the black square of black drawing marks 310. In FIG. 2c, the user has erased the gray drawing marks 312 from a right edge of the black square of black drawing marks 310 without erasing any of the black drawing marks 310. It is to be appreciated that even if the recent mark eraser 308 touches a portion of drawing interface 112 that includes both the black drawing marks 310 and the gray drawing marks 312, that only the gray drawing marks 312 will be erased by recent mark eraser 308.

Figure 3D:
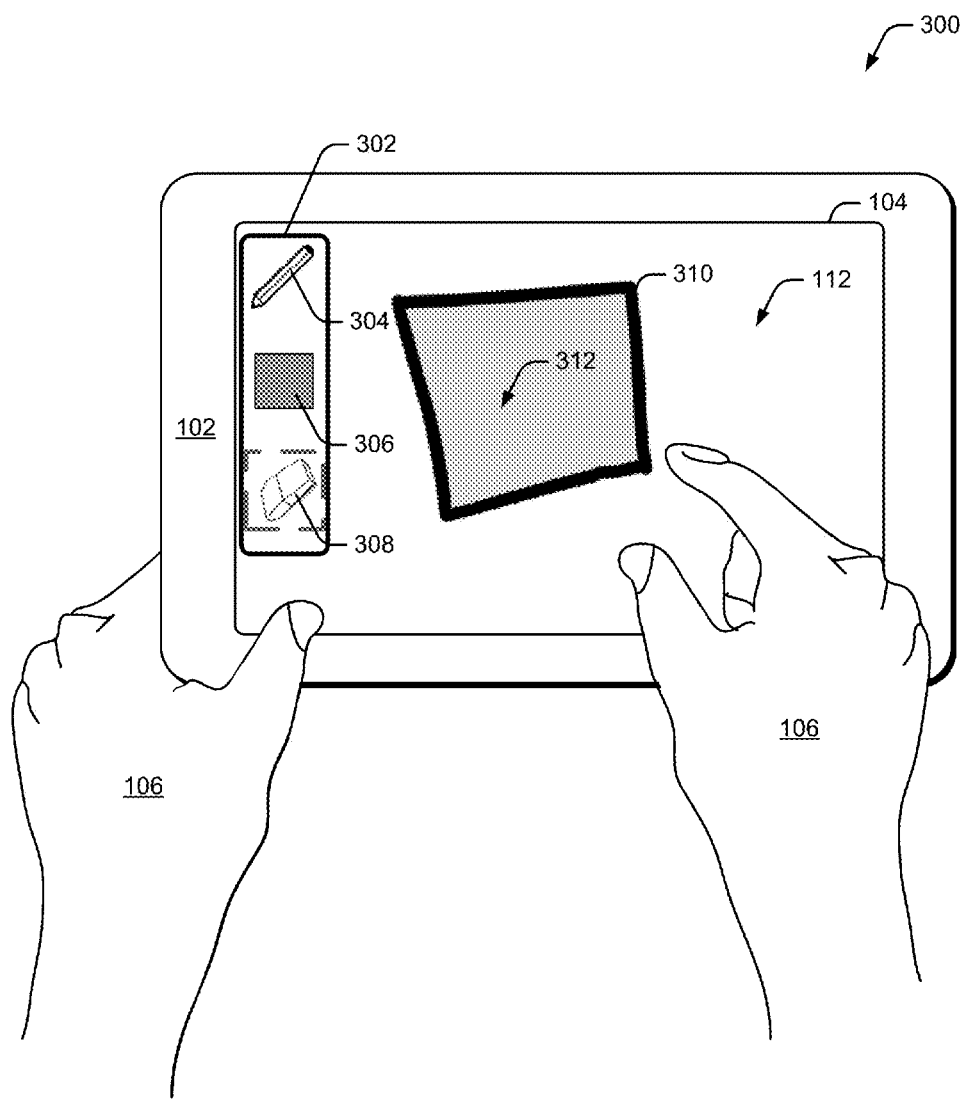

In FIG. 3d, the user finishes erasing gray drawing marks 312 from all four edges of the black square of black drawing marks 310, leaving a clean black square with the gray color inside the square but not bleeding over the edges of the black square.

Example Procedures

The following discussion describes techniques for recent mark editing actions. Aspects of these procedures may be implemented in hardware, firmware, or software, or a combination thereof. The procedures are shown as a set of blocks that specify operations performed by one or more devices and is not necessarily limited to the order shown for performing the operations by the respective blocks. In portions of the following discussion, reference will be made to FIG. 1.

Figure 4:
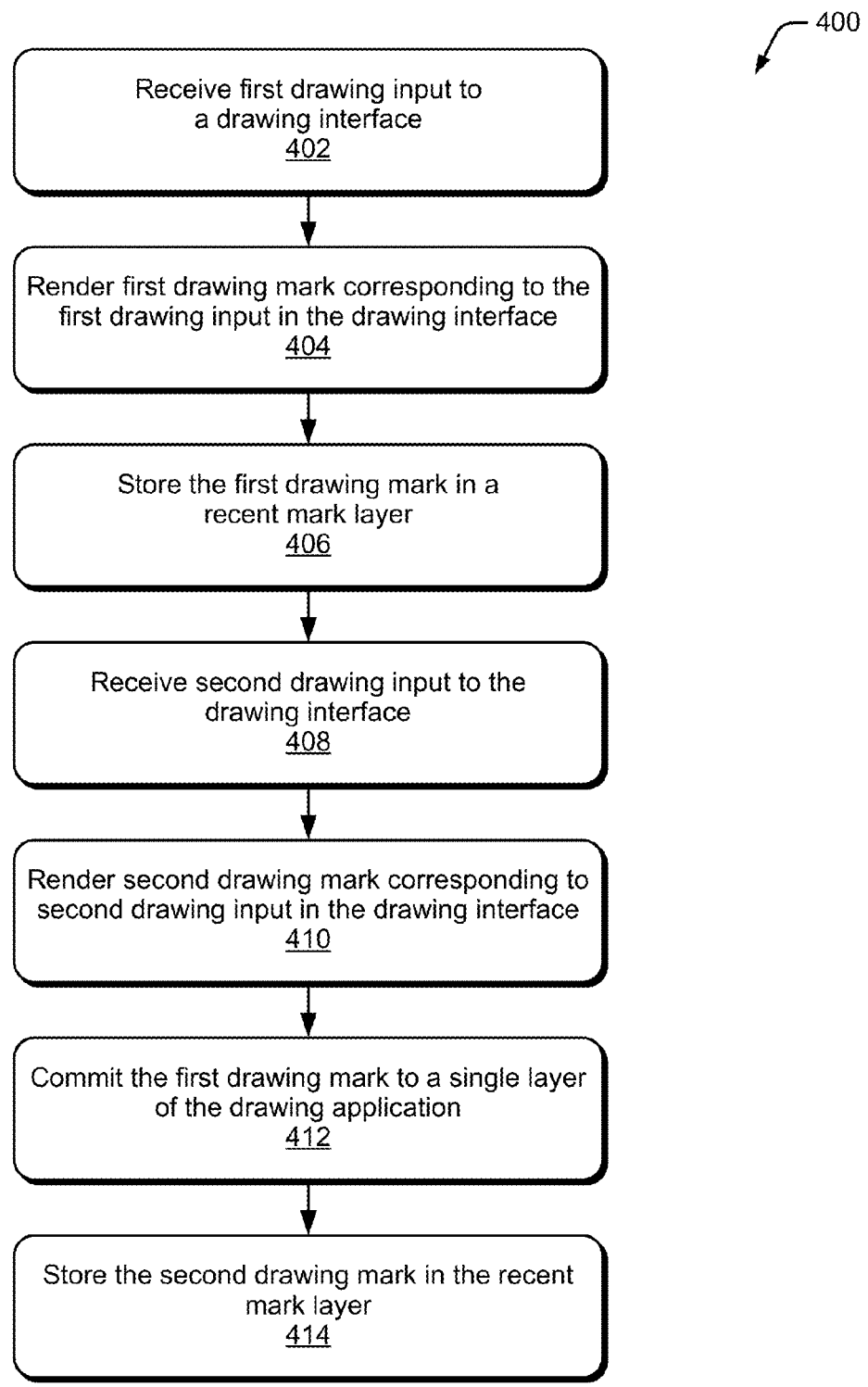
FIG. 4 illustrates a procedure in an example implementation of storing drawing marks in a recent mark layer.

FIG. 4 illustrates a procedure 400 in an example implementation of storing drawing marks in the recent mark layer. At 402, a first drawing input to a drawing interface is received. For example, drawing interface 112 (FIG. 1) of drawing application 110 receives first drawing input from a drawing tool 114.

At 404, a first drawing mark corresponding to the first drawing input is rendered in the drawing interface. For example, drawing application 110 renders a first drawing mark corresponding to the first drawing input in drawing interface 112.

At 406, the first drawing mark is stored in a recent mark layer. For example, recent mark tool 116 stores the first drawing mark in recent mark layer 118.

At 408, second drawing input to the drawing interface is received. For example, drawing interface 112 receives second drawing input from a drawing tool 114. Drawing tool 114 may be the same or different as the drawing tool used to input the first drawing input at step 402.

At 410, a second drawing mark corresponding to the second drawing input is rendered in the drawing interface. For example, drawing application 110 renders a second drawing mark corresponding to the second drawing input in drawing interface 112.

At 412, the first drawing mark is committed to a single layer of the drawing application. For example, drawing application 110 commits the first drawing mark, which is currently stored in recent mark layer 118, to single layer 120 of drawing application 110.

At 414, the second drawing mark is stored in the recent mark layer. For example, recent mark tool 116 stores the second drawing mark in recent mark layer 118 to replace the first drawing mark. As described throughout, the second drawing mark is automatically and temporarily stored in recent mark layer 118 until a next drawing mark is drawn on drawing interface 112.

Figure 5:
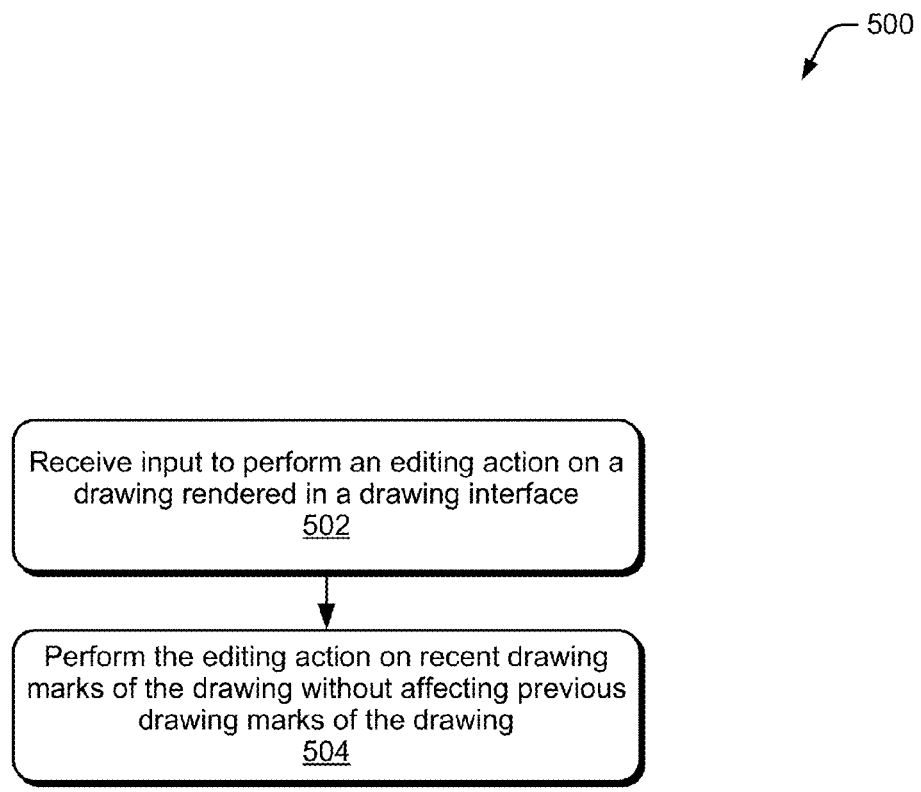
FIG. 5 illustrates a procedure in an example implementation of performing an editing action on recent drawing marks.

FIG. 5 illustrates a procedure 500 in an example implementation of performing an editing action on recent drawing marks. At 502, input to perform an editing action on a drawing rendered in a drawing interface is received. For example, drawing application 110 receives input to perform an editing action on a drawing rendered in drawing interface 112 using recent mark tool 116. The editing action may correspond to any type of editing action, such as an action to erase, move, or resize drawing marks of the drawing.

At 504, the editing action is performed on recent marks of the drawing without affecting previous marks of the drawing. For example, drawing application 110 performs the editing action on recent drawing marks stored in recent mark layer 118 without affecting previous marks which have been committed to single layer 120.

Figure 6:
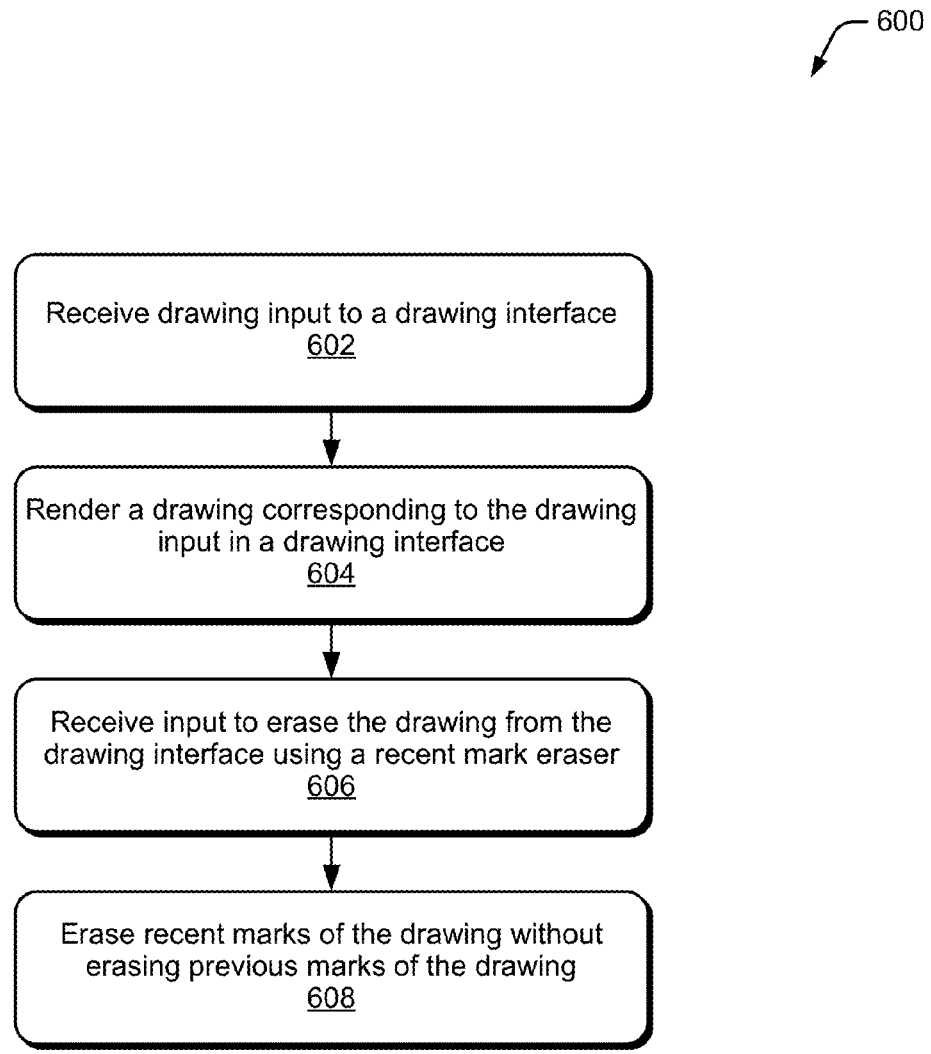
FIG. 6 illustrates a procedure in an example implementation of erasing recent drawing marks.

FIG. 6 illustrates a procedure 600 in an example implementation of erasing recent drawing marks. At 602, a drawing input to a drawing interface is received. For example, drawing interface 112 (FIG. 1) of drawing application 110 receives drawing input from a drawing tool 114.

At 604, a drawing corresponding to the drawing input is rendered in the drawing interface. For example, drawing application 110 renders a drawing corresponding to the drawing input in drawing interface 112.

At 606, input to erase the drawing from the drawing interface using a recent mark eraser is received. For example, drawing application 110 receives input to erase the drawing from drawing interface 112 using recent mark tool 116, which in this case is implemented as a recent mark eraser.

At 608, recent drawing marks of the drawing are erased from drawing interface 112 without erasing previous drawing marks of the drawing. For example, drawing application 110 erases recent drawing marks stored in recent mark layer 118 from drawing interface 112 without erasing previous drawing marks committed to single layer 120.

Having described example procedures in accordance with one or more implementations, consider now an example system and device that can be utilized to implement the various techniques described herein.

Example System and Device

FIG. 7 illustrates an example system generally at 700 that includes an example computing device 702 that is representative of one or more computing systems and/or devices that may implement the various techniques described herein. This is illustrated through inclusion of drawing application 110, which operate as described above. The computing device 702 may be, for example, a server of a service provider, a device associated with a client (e.g., a client device), an on-chip system, and/or any other suitable computing device or computing system.

The example computing device 702 is illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device implementation, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
receiving first drawing input to a drawing interface of a drawing application;
rendering first drawing marks corresponding to the first drawing input in the drawing interface;
automatically and temporarily storing the first drawing marks in a recent mark layer;
receiving second drawing input to the drawing interface of the drawing application;
rendering second drawing marks corresponding to the second drawing input in the drawing interface;
automatically and temporarily storing the second drawing marks in the recent mark layer, the storing the second drawing marks causing the second drawing marks to replace the first drawing marks and causing the first drawing marks to be committed to a single layer of the drawing application;
receiving input from a recent mark eraser at an area of the drawing interface that includes the first drawing marks and the second drawing marks; and
erasing the second drawing marks from the drawing interface without erasing the first drawing marks based on the second drawing marks being stored in the recent mark layer.

2. The computer-implemented method of claim 1, wherein the second drawing marks are automatically and temporarily stored in the recent mark layer until a next drawing input is received.

3. The computer-implemented method of claim 1, wherein the erasing comprises identifying the second drawing marks in the recent mark layer, and erasing the second drawing marks without erasing the first drawing marks.

4. The computer-implemented method of claim 1, wherein the storing the first drawing marks in the recent mark layer causes the first drawing marks to replace previous drawing marks in the recent mark layer.

5. The computer-implemented method of claim 4, wherein the storing the first drawing marks in the recent mark layer causes the previous drawing marks to be committed to the single layer of the drawing application.

6. The computer-implemented method of claim 1, wherein the drawing application comprises a single layer drawing application.

7. The computer-implemented method of claim 1, wherein the first drawing marks are committed to the single layer of the drawing application and compressed with previously-committed drawing marks.

8. The computer-implemented method of claim 1, further comprising:
receiving input to perform an editing action on an additional area of the drawing interface that includes the first drawing marks and the second drawing marks; and
performing the editing action on the second drawing marks without affecting the first drawing marks, the editing action comprising an action other than an erase action.

9. One or more computer-readable storage media comprising instructions stored thereon that, responsive to execution by a computing device, cause the computing device to perform operations comprising:
receiving first drawing input to a drawing interface of a drawing application;
rendering a first drawing mark corresponding to the first drawing input in the drawing interface;
automatically and temporarily storing the first drawing mark in a recent mark layer;
receiving second drawing input to the drawing interface;
rendering a second drawing mark corresponding to the second drawing input in the drawing interface;
automatically and temporarily storing the second drawing mark in the recent mark layer, the storing the second drawing mark causing the second drawing mark to replace the first drawing mark and causing the first drawing mark to be committed to a single layer of the drawing application;
receiving input from a recent mark eraser at an area of the drawing interface that includes the first drawing mark and the second drawing mark; and
erasing the second drawing mark from the drawing interface without erasing the first drawing mark based on the second drawing mark being stored in the recent mark layer.

10. The one or more computer-readable storage media of claim 9, wherein the instructions, responsive to execution by the computing device, cause the computing device to perform operations further comprising:
receiving third drawing input to the drawing interface;
rendering a third drawing mark on the drawing interface;
committing the second drawing mark to the single layer of the drawing application; and
storing the third drawing mark in the recent mark layer to replace the second drawing mark.

11. The one or more computer-readable storage media of claim 9, wherein the instructions, responsive to execution by the computing device, cause the computing device to perform operations further comprising:
receiving input to perform an editing action on an additional area of the drawing interface that includes the first drawing mark and the second drawing mark; and
performing the editing action on the second drawing mark without affecting the first drawing mark, the editing action comprising an action other than an erase action.

12. The one or more computer-readable storage media of claim 11, wherein the editing action comprises a move action or a resize action.

13. The one or more computer-readable storage media of claim 9, wherein the storing the first drawing mark in the recent mark layer causes the first drawing mark to replace a previous drawing mark in the recent mark layer.

14. The one or more computer-readable storage media of claim 13, wherein the storing the first drawing mark in the recent mark layer causes the previous drawing mark to be committed to the single layer of the drawing application.

15. The one or more computer-readable storage media of claim 9, wherein the drawing application comprises a single layer drawing application.

16. A computing device comprising:
at least a memory and a processor to implement a drawing application, the drawing application configured to:
receive first drawing input to a drawing interface of the drawing application;
render first drawing marks corresponding to the first drawing input in the drawing interface;
automatically and temporarily store the first drawing marks in a recent mark layer;
receive second drawing input to the drawing interface of the drawing application;
render second drawing marks corresponding to the second drawing input in the drawing interface;
automatically and temporarily store the second drawing marks in the recent mark layer, the storing the second drawing marks causing the second drawing marks to replace the first drawing marks and causing the first drawing marks to be committed to a single layer of the drawing application;

receive input from a recent mark eraser at an area of the drawing interface that includes the first drawing marks and the second drawing marks; and erase the second drawing marks from the drawing interface without erasing the first drawing marks based on the second drawing marks being stored in the recent mark layer.

17. The computing device of claim 16, wherein the drawing application is configured to automatically and temporarily store the second drawing marks in the recent mark layer until a next drawing input is received.

18. The computing device of claim 16, wherein the drawing application is configured to erase the second drawing marks from the drawing interface by identifying the second drawing marks in the recent mark layer, and erasing the second drawing marks without erasing the first drawing marks.

19. The computing device of claim 16, wherein the drawing application is configured to store the first drawing marks in the recent mark layer to cause the first drawing marks to replace previous drawing marks in the recent mark layer.

20. The computing device of claim 19, wherein the drawing application is configured to store the first drawing marks in the recent mark layer to cause the previous drawing marks to be committed to the single layer of the drawing application.

* * * * *